INVENTORS
John R. Madeira
Roy F. Lo Presti
Richard F. Boersma
BY Murray A. Gleeson
ATTORNEY Sept. 10, 1957   J. R. MADEIRA ET AL   2,805,758
ARTICULATED CONVEYOR Filed Feb. 14, 1955   3 Sheets-Sheet 2

INVENTORS
John R. Madeira
Roy F. Lo Presti
Richard F. Boersma
BY Murray A. Gleeson
ATTORNEY Sept. 10, 1957  J. R. MADEIRA ET AL  2,805,758
ARTICULATED CONVEYOR
Filed Feb. 14, 1955  3 Sheets-Sheet 3
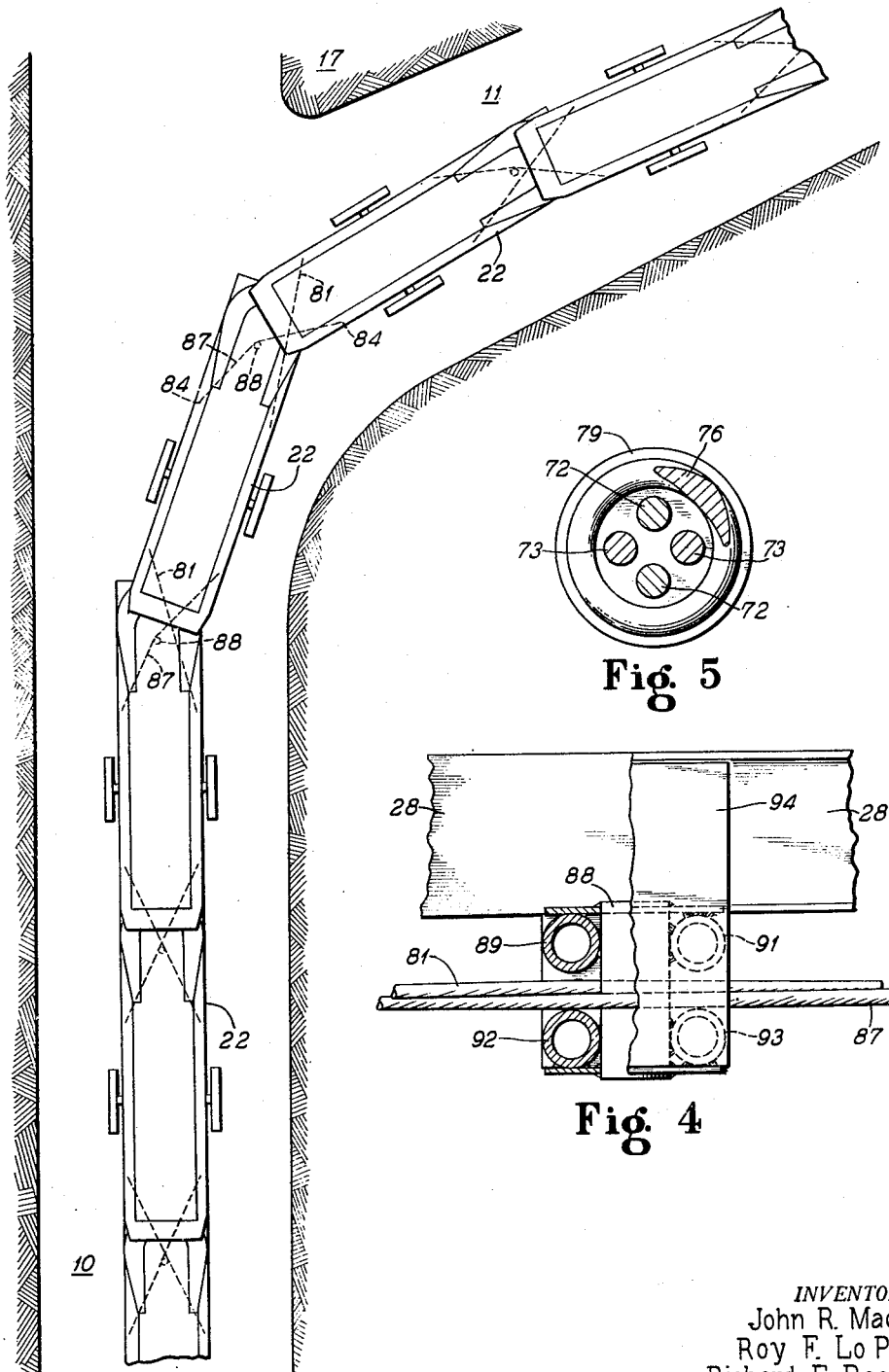
INVENTORS
John R. Madeira
Roy F. Lo Presti
Richard F. Boersma
BY Murray J. Gleeson
ATTORNEY

United States Patent Office 2,805,758
Patented Sept. 10, 1957

2,805,758

ARTICULATED CONVEYOR

John R. Madeira and Roy F. Lo Presti, Chicago, and Richard F. Boersma, Worth, Ill., assignors to Goodman Manufacturing Company, Chicago, Ill., a corporation of Illinois Application February 14, 1955, Serial No. 487,972

17 Claims. (Cl. 198—82)

This invention relates generally to articulated conveyors, and more particularly to a propelled conveyor capable of tracking in a sinuous path with an advancing or retracting continuous miner or the like.

One of the problems attendant upon modern day underground coal mining is that of providing mechanisms which can carry coal away from a continuous miner at a rate corresponding to the output thereof. It is anticipated that as much as five to six tons output per minute can be achieved by a continuous miner, but the problem of delivering such a tonnage from the working face in a continuous fashion does not readily lend itself to solution.

Probably one of the best types of mechanism heretofore employed has been a shuttle conveyor advancing with the miner and arranged to convey the miner's output and to discharge upon a cross conveyor at a tripper station, such cross conveyor in turn discharging upon the inby unit of a group of gathering conveyors.

While such shuttle conveyors are able to advance with the miner, they must be torn down when operations cease in a series of connected rooms, and when the miner starts another series of rooms, the conveyor must once more be set up. Such tear down and set up operations cause the miner to have an inordinate amount of down time, not to mention the labor necessary for new set ups.

According to the present invention there is provided an articulated cascade conveyor capable of removing the output from the miner at a corresponding rate, and also capable of being propelled with the miner in a sinuous path as the miner advances towards or retreats from the working face. The outby end of such conveyor is preferably arranged to straddle an endless gathering conveyor and to discharge thereon, the units making up the conveyor moving longitudinally with respect to such gathering conveyor during both advance of the miner and retreat of the same prior to taking a new position for advance.

Such a gathering conveyor may generally be disposed in an entry, and the miner in the described cases cuts entries paralleling the aforesaid entry, "break throughs" angling from the aforesaid entry connecting the entries cut by the miner. The cascade conveyor according to the present invention is capable of describing extremely short radius curves in extending from the entry containing the gathering conveyor, into the break through, and thence into one of the entries then being cut by the miner.

The sections making up such an articulated conveyor are connected together by flexible draft elements which are so arranged that one of such elements has its effective length shortened whereby the sections may describe a curve of extremely short radius if necessary, the sections following in the path of each other during both advance and retreat of the miner. By the provision of such means resulting in describing a curve of short radius, a train of such conveyor sections will not "cut the corner" at the ribs defining the cross cuts and entries.

With the foregoing considerations in mind it is a principal object of the invention to provide a cascade articulated conveyor capable of negotiating the very short radius turns such as would be required in a mine underground or the like.

Another object is to provide a novel draft connection between wheel mounted vehicles of the kind disclosed herein, whereby a plurality of connected vehicles are capable of negotiating very short radius turns, whilst at the same time preserving a correct "tracking" relationship.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown, such other embodiments being intended to be reserved especially as they fall within the purview of the subjoined claims.

In the drawings:

Fig. 4 is a detailed view taken substantially along the planes indicated by the arrows 4—4 seen in Fig. 2, and looking in the direction of said arrows;

Figure 3:
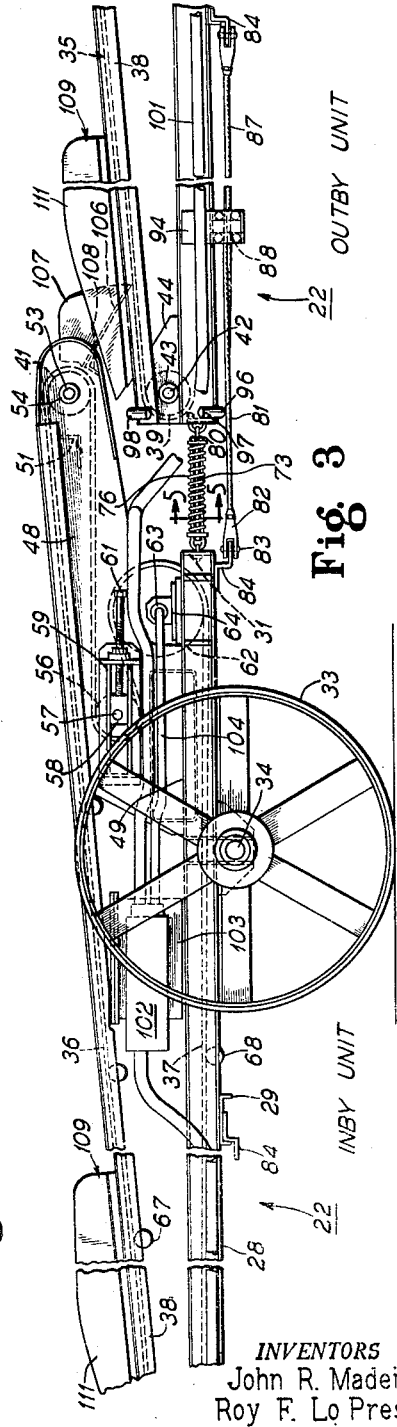
Fig. 3 is a side view thereof.

Fig. 5 is a vertical section taken through a resilient towbar connecting the sections, said view being taken along the line 5—5 of the Fig. 3 looking in the direction of the arrows; and Fig. 6 is a more or less schematic plan view showing the conveyor sections describing a curve of rather short radius, and showing schematically means whereby the sections may describe a shorter curve than has been possible heretofore.

Figure 1:
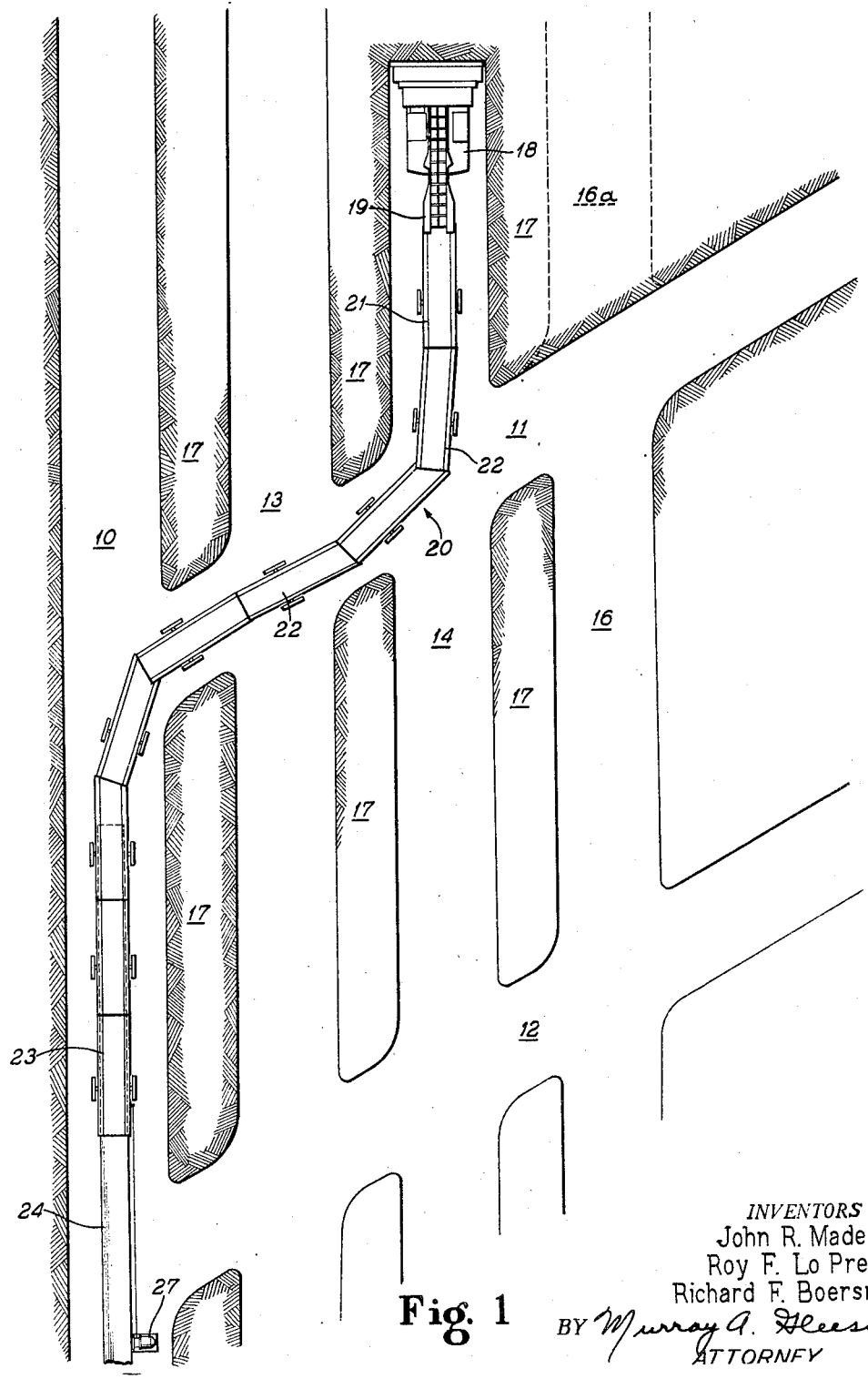
Fig. 1 is a more or less schematic plan view of an underground mine, showing a mechanical miner in position of operation in one of the entries thereof, and showing a shuttle or gathering conveyor for receiving the output from the mechanical miner, said conveyor and said miner being connected by an articulated conveyor having the improvements according to the present invention embodied therein.

Referring now particularly to Fig. 1 of the drawings, there is shown a mine underground having an entry 10 which is intersected by a number of breakthroughs 11 and 12 which angle off from the entry 10. A number of entries 13, 14 and 16 are shown paralleling the entry 10 and intersecting the breakthroughs 11 and 12. These entries are defined by ribs 17 which remain in place upon the removal of material from the seam or vein for support of the roof.

A mechanical miner 18 is shown operating within the entry 14 and is provided with a discharge boom 19 to discharge cuttings upon the inby section 21 of an articulated cascade conveyor indicated generally by the reference numeral 20. The inby section 21 is arranged to discharge upon an intermediate section 22 which is connected in cascade relationship to its next adjacent outby section, the intermediate sections 22 being connected articulately, an outby section 23 thereof being arranged to discharge upon a shuttle conveyor 24 disposed in the entry 10. The shuttle conveyor 24 may be of the type as shown in an application of Richard F. Boersma, Ser. No. 451,404, filed August 23, 1954, and now Patent No. 2,776,504, for improvements in Shuttle Conveyor and Tripper Station Therefor.

As seen in Fig. 1 the articulated conveyor 20 is shown as describing a curve at the intersection of the breakthrough 11 with the entry 10, and at the intersection of the entry 14 with the breakthrough 11. The so-connected conveyor section making up the articulated conveyor 20 are arranged to follow or advance with the continuous miner 18, the outby sections thereof, prior to describing a curve being arranged to straddle the shuttle conveyor 24 and to move therealong with the advance of the continuous miner. The intermediate conveyor sections 22 describe the curve seen in Fig. 1 as needed, after being moved from a position overlying the shuttle conveyor 24.

After such retreat of the miner 18 it may then be advanced into an entry 16a continuous with the entry 16, and the mining operation continued as before. Structure for accomplishing the required short radius curves described by the articulated conveyor 20 in moving with the miner 18 upon advance and retreat thereof will now be described.

Referring now to Figs. 2 to 5 of the drawings, each of the conveyor sections 21, 22 and 23 consists of a frame work defined by spaced side channel members 28 which are held in proper spaced relationship by a laterally extending channel member 29, an end angle member 31 at the outby end of the channel member 28, and at the inby end thereof by an angle member 32. The frame thus far described is mounted upon a pair of wheels 33 arranged to turn on an axle 34 spanning the distance between the side members 38.

Each of the conveyor sections 22 is provided with an endless conveyor 35 having an upper reach 36 and a lower or return reach 37. The upper reach 36 guided between and upon spaced angle members 38, and is trained around an idler pulley 39 at the inby end thereof and an idler pulley 41 at the outby or discharge end thereof. The idler pulley 39 is mounted upon a shaft 42 received at each end in a bearing 43 supported in a mounting plate 44 welded to the vertical flange of the angle 38 and to the web of the side channel members 28. At the inby end of the conveyor sections the structure may be additionally stiffened by angle members 47 spanning the distance between the channel members 28. The spaced angles 38 are supported at the outby end by a pair of spaced plates 48 which are welded as at 49 to the top flange of the side channel members 28. The two plates 48, 48 may be held in proper spaced relationship by means of an angle 51 having its ends welded to the inner faces of the plates 48.

The upper reach 36 of the conveyor belt is trained around the idler pulley 41 disposed at the outby end of the conveyor section 22, and turning upon an axle 53 each end of which is mounted in a bearing 54 disposed on the outer faces of the vertical side plates 48, 48.

After having been reversed in direction about the idler pulley 41, the belt is trained around an idler takeup pulley 56 disposed beneath the conveying reach 36 and having a shaft 57 held at each end in an adjustable pillow block 58 adjusted in its position within a support guide 59 by means of an adjusting screw 61, each such guide 59 being mounted on the inner faces of the vertical side plates 48, 48.

A driving pulley for the belt 62 has a self-contained driving motor, not shown, and is mounted upon a shaft 63 held in supports 64 mounted on the side channel members 28.

The upper or conveying reach of the belt 36 is guided by troughing rollers 66, 66 and a center support roller 67, the return reach of the belt being guided by a return idler roller 68 spanning the distance between the channel members 28.

Each conveyor section 22 is arranged to be connected to its next adjacent section by means of a draw bar and guiding assembly as will now be described.

The sections are resiliently connected by means of a draw bar consisting of a hitch eye 71 secured to the vertical leg of the flange 31 at the outby end of the conveyor section 22. The opening of the eye 71 is in a horizontal plane, and a connector fork 70 has its tines lying in a vertical plane as seen in Fig. 5. Connector fork 70 is arranged to interengage with a fork 75 having tines 73 lying in a horizontal plane. Fork 75 is connected to a hitch eye 74 secured to the vertical limb of the angle member 32 at the inby end of the next adjacent inby section. As seen, hitch eye 74 has its opening lying in a vertical plane. The tines 72 and 73 are surrounded by the coil spring 76 which abuts a stop 77 at one end thereof, and held in position by nuts 78 threaded to the ends of the tines 73, the other end of the spring 76 abutting a stop 79 which is held in position by means of nuts 80 threaded to the ends of the tines 72.

It will thus be seen that the two fork connectors 70 and 75 together with the resilient spring 76 afford a free articulating connection between the adjacent sections, which connection is free to expand or contract in accordance with the amount of articulating movement of the sections in describing a curve as will appear presently.

Figure 2:
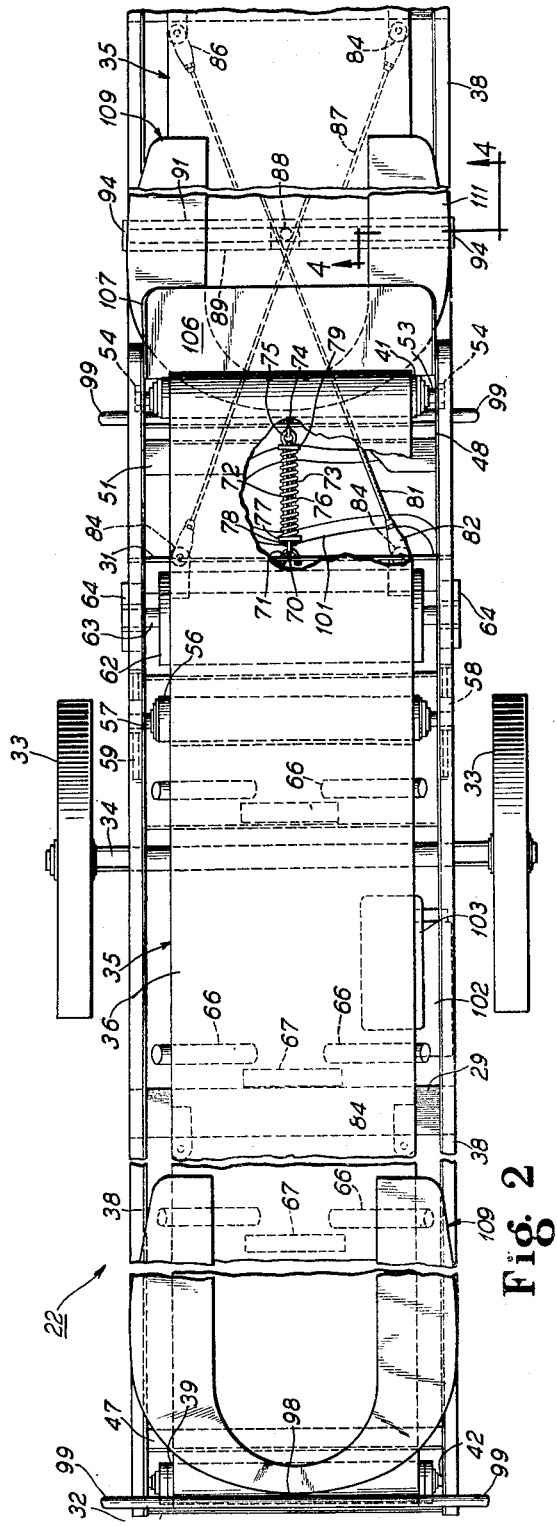
Fig. 2 is a plan view of a section making up the articulated conveyor according to the present invention shown in Fig. 1.

The adjacent conveyor sections are additionally connected by a pair of flexible cables which determine the radius described by the connected sections in turning a curve, as seen in Fig. 1. As seen in Figs. 2 and 3 the cables intersect each other and one such cable 81 is provided at the inby end thereof with a clevis 82 having a pinned connection as at 83 to a connecting lug 84 welded to the underside of the horizontal leg of the end angle member 31 disposed at the discharge end of the next adjacent inby section. The aforesaid connection is made at one side of the discharge end of such inby section, while the outby end of the cable 81 is similarly provided with a clevis 86 connected to a similar connecting lug 84 on the opposite side of the next adjacent outby section.

A similar cable 87 is connected in a similar fashion to the outby end of the inby section, but at the other side thereof, and to the outby section to a similar lug 84 but disposed at the opposite side of such outby section. For sake of convenience the sections are labelled inby and outby.

The point of connection of the draft cables 81 and 87 to the outby section is at a point spaced from the axle 34 of the wheels 33. Such points of connection 84 to the outby section may be somewhere adjacent a point midway between the axle 34 and the inby end of such outby section.

As seen in Figs. 2 and 3, the cables intersect beneath the outby section, and as seen in Fig. 6 the so-connected conveyor section are describing a curve, as for example, in moving from the entry 10 to the breakthrough 11 shown in Fig. 1. Means are provided to shorten the effective length between the points of connection of one of the cables so as to cause the individual conveyor section 22 on such curve to have a desirably short radius of turning.

For example, in Fig. 5 there is shown a curve to the right described by the connected sections, and in order for the individual sections to describe a desirably shorter radius of turning, the cable 87 will be required to be bent somewhere along its length so that the length between its points of anchorage will be shortened.

To this end there is provided a post 88 around which cable 81 or 87 will be bent according to the direction of turning of the connected sections. The post 88 is circular in cross section and is welded at points on its periphery to a pair of tubular guides 89 and 91 at its upper end and at its lower end to a pair of similar tubular guides 92 and 93. Each of these guides is supported at its ends by being welded to a plate 94 which in turn is welded to the outer edges of the flanges of the spaced frame members 28.

The cables are thus supported at a point along their length whilst one or the other is capable of being bent about the post 88.

In following uneven ground a certain amount of displacement of the conveyor sections with respect to each other takes place in a vertical plane, and in order to prevent kinking of the cables 81 and 87 the inby end of each section is provided with a lower tubular stop rail 96 which spans the distance between the side frame members 28, extensions 97 from the stop rail providing hand holds for the movement of the sections when separated from each other. The movement of the outby end of the inby section is likewise limited by means of a stop rail 98 spanning the distance between the top flanges 38, said stop rail terminating in hand holds 99 for a purpose similar to the extensions 97.

As seen in Figs. 2 and 3, each of the individual sections 22 is also arranged to support a power cable 101 supplying power to the motor enclosed within the driving pulley 62. The cable 101 is connected to a junction box 102 and a circuit breaker 103 carried by each section, the junction box 102 also having a cable 104 extending therefrom and connected to the motor for the driving pulley 62.

The material moved by the individual conveyor section is adapted to be discharged by the conveying reach 36 of its conveyor belt and the contents are arranged to slide down a chute 106 having side rails 107, the chute 106 being supported upon an angle member 108 spanning the distance between the side plates 48. In order to accommodate the articuating movement of the discharging movement without spillage the inby end of each section is provided with a hopper structure 109 having flared sides 111, and supported upon the flanges of the angle members supporting the conveying reach 36 of the conveyor belt.

Referring again to Figs. 1 and 6, it will be noted that in describing a curve to the right when the conveyor is caused to move from the entry 10 into the breakthrough 11, the cable 87 will be required to be bent about the post 88 thereby shortening the distance between its point of anchorage 84 on the two adjacent and connected sections. Conversely, if the so connected conveyor sections are caused to describe a curve to the left the other cable 81 will have its effective length shortened by being bent about the post 88.

It will be apparent from the description foregoing that there has been provided a novel form of articuated conveyor capable of folowing a sinuous path as desired behind a continuous miner or the like. According to the invention, the conveyor sections are self tracking one behind the other, and are capable of following curves of a shorter radius than has been possible heretofore by reason of the fact that the angularity between the sections may be increased by shortening desirably the effective length of one of the crossed draft connectors.

Moreover, the provision of the resilient tow bar enables the slack at all times to be taken up between contiguous conveyor sections, the resiliency of such tow bar connections at the same time permitting of a shortening of the effective length of one of the flexible draft connectors.

Upon retreat of the conveyor section, being retreated with the miner 13 by means of the winch 27 seen in Fig. 1, the individual sections will track properly upon such retreat in the same fashion as in their advance with the miner. Since the resilient tow bar preserves, together with the cables 81 and 87, the same orientation of the individual conveyor sections with respect to each other such retreat can be had over the same path as the path of advance of the so connected sections.

While the invention has been described in terms of a preferred embodiment thereof, its scope is intended to be limited only by the terms of the claims here appended.

We claim as our invention:

1. An articulated cascading conveyor comprising individual conveyor sections each having an endless conveyor thereon arranged to discharge the contents of one conveyor section to an adjacent conveyor section, means for transmitting power between said sections for driving the endless conveyor of each, each of said conveyor sections having a fixed axle with ground engaging wheels turning thereon, an articulating connection between adjacent conveyor sections affording a means whereby one section will follow in the path of an adjacent section, said articulated connection comprising a pair of flexible draft connectors, one of which is connected from one side of one such sections to an opposite side of an adjacent section, the other of which is connected from the opposite side of the said one of such sections to a side on the adjacent section substantially opposite to the draft connection of the first named draft connector to said adjacent section, means for shortening the effective length of one of said draft connectors so that said sections may negotiate a turn of short radius, said means being disposed adjacent the point of intersection of said flexible draft connectors, and being arranged to bend one of said flexible draft connectors therearound in describing a curve of short radius, and a resilient towbar between adjacent sections arranged to change its length in accordance with the amount of articulation of said sections.

2. An articulated cascading conveyor comprising individual conveyor sections each having an endless conveyor thereon arranged to discharge the contents of one conveyor section to an adjacent conveyor section, means for transmitting power between said sections for driving the endless conveyor of each, each of said conveyor sections having a fixed axle with ground engaging wheels turning thereon, an articulating connection between adjacent conveyor sections affording a means whereby one section will follow in the path of an adjacent section, said articulated connection comprising a pair of flexible draft connectors, one of which is connected from one side of one such sections to an opposite side of an adjacent section, the other of which is connected from the opposite side of the said one of such sections to a side on the adjacent section substantially opposite to the draft connection of the first named draft connector to said adjacent section, means for shortening the effective length of one of said flexible draft connectors so that said sections may negotiate a turn of short radius, and a resilient tow bar between adjacent sections arranged to change its length in accordance with the amount of articulation of said sections.

3. An articulated cascading conveyor comprising individual conveyor sections each having an endless conveyor thereon arranged to discharge the contents of one conveyor section to an adjacent conveyor section, means for transmitting power between said sections for driving the endless conveyor of each, each of said conveyor sections having a fixed axle with ground engaging wheels turning thereon, an articulating connection between adjacent conveyor sections affording a means whereby one section will follow in the path of an adjacent section, said articulated connection comprising a pair of flexible draft connectors, one of which is connected from one side of one such sections to an opposite side of an adjacent section, the other of which is connected from the opposite side of the said one of such sections to a side on the adjacent section substantially opposite to the draft connection of the first named draft connector to said adjacent section, and a resilient towbar between adjacent sections arranged to change its length in accordance with the amount of articulation of said sections.

4. An articulated cascading conveyor comprising individual conveyor sections each having an endless conveyor thereon arranged to discharge the contents of one conveyor section to an adjacent conveyor section, means for transmitting power between said sections for driving the endless conveyor of each, each of said conveyor sections having a fixed axle with ground engaging wheels turning thereon, an articulating connection between adjacent conveyor sections affording a means whereby one section will follow in the path of an adjacent section, said articulated connection comprising a pair of flexible draft connectors, one of which is connected from one side of one such sections to an opposite side of an adjacent section, the other of which is connected from the opposite side of the said one of such sections to a side on the adjacent section substantially opposite to the draft connection of the first named draft connector to said adjacent section, and means for shortening the effective length of one of said flexible draft connectors so that said sections may negotiate a turn of short radius, said means being disposed adjacent the point of intersection of said flexible draft connectors and being arranged to bend one of said flexible draft connectors therearound in describing a curve of short radius.

5. An articulated cascading conveyor comprising indivdual conveyor sections each having an endless conveyor thereon arranged to discharge the contents of one conveyor section to an adjacent conveyor section, means for transmitting power between said sections for driving the endless conveyor of each, each of said conveyor sections having a fixed axle with ground engaging wheels turning thereon, an articulating connection between adjacent conveyor sections affording a means whereby one section will follow in the path of an adjacent section, said articulated connection comprising a pair of flexible draft connectors, one of which is connected from one side of one such sections to an opposite side of an adjacent section, the other of which is connected from the opposite side of the said one of such sections to a side on the adjacent section substantially opposite to the draft connection of the first named draft connector to said adjacent section, and means for shortening the effective length of one of said flexible draft connectors so that said sections may negotiate a turn of short radius, said means being disposed adjacent the point of intersection of said draft connectors.

6. An articulated cascading conveyor comprising individual conveyor sections each having an endless conveyor thereon arranged to discharge the contents of one conveyor section to an adjacent conveyor section, means for transmitting power between said sections for driving the endless conveyor of each, each of said conveyor sections having a fixed axle with ground engaging wheels turning thereon, an articulating connection between adjacent conveyor sections affording a means whereby one section will follow in the path of an adjacent section, said articulated connection comprising a pair of flexible draft connectors, one of which is connected from one side of one such sections to an opposite side of an adjacent section, the other of which is connected from the opposite side of the said one of such sections to a side on the adjacent section substantially opposite to the draft connection of the first named draft connector to said adjacent section, and means for shortening the effective length of one of said draft connectors so that said sections may negotiate a turn of short radius.

7. An articulating connection for a pair of mobile sections each having a fixed axle with ground engaging wheels turning thereon, said articulating connection affording a means for connecting adjacent ends of said sections so that one will follow in the path of the other and comprising a pair of flexible draft connectors, one of which is connected from one side of one of such sections to an opposite side of an adjacent section, the other of which is connected from the opposite side of the said one of such sections to a side on the adjacent section substantially opposite to the draft connection of the first named draft connector to said adjacent section, and means for shortening the effective length of one of said draft connectors so that said mobile sections may negotiate a turn of short radius, said means being disposed adjacent the point of intersection of said draft connectors, and being arranged to bend one of said draft connectors therearound in describing a curve of short radius.

8. An articulating connection for a pair of mobile sections each having a fixed axle with ground engaging wheels turning thereon, said articulating connection affording a means for connecting adjacent ends of said sections so that one will follow in the path of the other and comprising a pair of flexible draft connectors, one of which is connected from one side of one of such sections to an opposite side of an adjacent section, the other of which is connected from the opposite side of the said one of such sections to a side on the adjacent section substantially opposite to the draft connection of the first named draft connector to said adjacent section, and means for shortening the effective length of one of said draft connectors so that said mobile sections may negotiate a turn of short radius, said means being disposed adjacent the point of intersection of said draft connectors.

9. An articulating connection for a pair of mobile sections each having a fixed axle with ground engaging wheels turning thereon, said articulating connection affording a means for connecting adjacent ends of said sections so that one will follow in the path of the other and comprising a pair of flexible draft connectors, one of which is connected from one side of one of such sections to an opposite side of an adjacent section, the other of which is connected from the opposite side of the said one of such sections to a side on the adjacent section substantially opposite to the draft connection of the first named draft connector to said adjacent section, and means for shortening the effective length of one of said draft connectors so that said mobile sections may negotiate a turn of short radius.

10. An articulating connection for a pair of mobile sections each having a fixed axle with ground engaging wheels turning thereon, said articulating connection affording a means for connecting adjacent ends of said sections so that one will follow in the path of the other and comprising a pair of flexible draft connectors, one of which is connected from one side of one of such sections to an opposite side of an adjacent section, the other of which is connected from the opposite side of the said one of such sections to a side on the adjacent section substantially opposite to the draft connection of the first named draft connector to said adjacent section, and a resilient towbar between adjacent sections arranged to change its length in accordance with the amount of articulation of said sections.

11. An articulated cascading conveyor comprising individual conveyor sections having ground engaging members and flexible draft means connecting said sections together, said flexible draft means including a flexible draft connector extending from a point adjacent the inby end of one of said sections at one side thereof to a point adjacent the outby end of a section inby of said one section at a corresponding opposite side thereof, a second flexible draft connector extending between correspondingly opposite points on said sections, and means for shortening the effective length of one of said draft connectors so that said sections may negotiate a turn of short radius, said means being disposed adjacent the point of intersection of said flexible draft connectors, and being arranged to bend one of said flexible draft connectors therearound in describing a curve of short radius, and a resilient towbar between adjacent sections arranged to change its length in accordance with the amount of articulation of said sections.

12. An articulated cascading conveyor comprising individual conveyor sections having ground engaging members and flexible draft means connecting said sections together, said flexible draft means including a flexible draft connector extending from a point adjacent the inby end of one of said sections at one side thereof to a point adjacent the outby end of a section inby of said one section at a corresponding opposite side thereof, a second flexible draft connector extending between correspondingly opposite points on said sections, and means for shortening the effective length of one of said flexible draft connectors so that said sections may negotiate a turn of short radius, and a resilient towbar between adjacent sections arranged to change its length in accordance with the amount of articulation of said sections.

13. An articulated cascading conveyor comprising individual conveyor sections having ground engaging members and draft means connecting said sections together, said draft means including a draft connector extending from a point adjacent the inby end of one of said sections at one side thereof to a point adjacent the outby end of a section inby of said one section at a corresponding opposite side thereof, a second draft connector extending between correspondingly opposite points on said sections, means for shortening the effective length of one of said draft connectors so that said sections may negotiate a turn of short radius, and a resilient towbar between adjacent sections arranged to change its length in accordance with the amount of articulation of said sections.

14. An articulated cascading conveyor comprising individual conveyor sections having ground engaging members and flexible draft means connecting said sections together, said flexible draft means including a flexible draft connector extending from a point adjacent the inby end of one of said sections at one side thereof to a point adjacent the outby end of a section inby of said one section at a corresponding opposite side thereof, a second flexible draft connector extending between correspondingly opposite points on said sections, and means for shortening the effective length of one of said flexible draft connectors so that said sections may negotiate a turn of short radius, said means being disposed adjacent the point of intersection of said flexible draft connectors, and being arranged to bend one of said flexible draft connectors therearound in describing a curve of short radius.

15. An articulated cascading conveyor comprising individual conveyor sections having ground engaging members and draft means connecting said sections together, said draft means including a draft connector extending from a point adjacent the inby end of one of said sections at one side thereof to a point adjacent the outby end of a section inby of said one section at a corresponding opposite side thereof, a second draft connector extending between correspondingly opposite points on said sections, and means for shortening the effective length of one of said draft connectors so that said sections may negotiate a turn of short radius, said means being disposed adjacent the point of intersection of said draft connectors.

16. An articulated cascading conveyor comprising individual conveyor sections having ground engaging members and flexible draft means connecting said sections together, said flexible draft means including a flexible draft connector extending from a point adjacent the inby end of one of said sections at one side thereof to a point adjacent the outby end of a section inby of said one section at a corresponding opposite side thereof, a second flexible draft connector extending between correspondingly opposite points on said sections, and means for shortening the effective length of one of said flexible draft connectors so that said sections may negotiate a turn of short radius.

17. An articulated cascading conveyor comprising individual conveyor sections having ground engaging members and draft means connecting said sections together, said draft means including a draft connector extending from a point adjacent the inby end of one of said sections at one side thereof to a point adjacent the outby end of a section inby of said one section at a corresponding opposite side thereof, a second draft connector extending between correspondingly opposite points on said sections, and means for shortening the effective length of one of said draft connectors so that said sections may negotiate a turn of short radius.

References Cited in the file of this patent

UNITED STATES PATENTS

| | | |
|---|---|---|
| 1,551,610 | Ohman | Sept. 1, 1925 |
| 2,313,235 | Grove | Mar. 9, 1943 |
| 2,722,409 | Bergmann | Nov. 1, 1955 |

FOREIGN PATENTS

| | | |
|---|---|---|
| 8,137 | Great Britain | Sept. 12, 1907 |
| 62,051 | Switzerland | July 3, 1912 |